US009883429B2

(12) United States Patent
Timms et al.

(10) Patent No.: US 9,883,429 B2
(45) Date of Patent: Jan. 30, 2018

(54) COMMUNICATIONS SYSTEM AND METHOD

(71) Applicant: Nomad Spectrum Limited, Newcastle Upon Tyne (GB)

(72) Inventors: Martin Timms, Stocksfield (GB); Caleb Carroll, Cochrane (CA)

(73) Assignee: Nomad Spectrum Limited, Newcastle Upon Tyne (GB)

(*) Notice: Subject to any disclaimer, the term of this patent is extended or adjusted under 35 U.S.C. 154(b) by 19 days.

(21) Appl. No.: 14/713,224

(22) Filed: May 15, 2015

(65) Prior Publication Data
US 2016/0295470 A1 Oct. 6, 2016

(30) Foreign Application Priority Data

Mar. 31, 2015 (GB) .................................. 1505500.7

(51) Int. Cl.
*H04W 36/00* (2009.01)
*H04W 36/14* (2009.01)
*H04L 29/08* (2006.01)
*H04W 64/00* (2009.01)
*H04W 84/00* (2009.01)

(52) U.S. Cl.
CPC ......... *H04W 36/0083* (2013.01); *H04L 67/06* (2013.01); *H04L 67/12* (2013.01); *H04L 67/18* (2013.01); *H04W 36/0016* (2013.01); *H04W 36/14* (2013.01); *H04W 64/003* (2013.01);
(Continued)

(58) Field of Classification Search
CPC . H04B 17/318; H04B 17/3913; H04W 4/025; H04W 4/028; H04W 64/006; H04W 16/18; H04W 24/10; H04W 36/245; H04W 36/32; H04W 4/027; H04W 64/003;
(Continued)

(56) References Cited

U.S. PATENT DOCUMENTS 5,953,722 A 9/1999 Lampert et al.
6,249,252 B1 6/2001 Dupray
(Continued)

FOREIGN PATENT DOCUMENTS

EP 1 830 596 9/2007

*Primary Examiner* — Kwasi Karikari
(74) *Attorney, Agent, or Firm* — Terry M. Sanks, Esq.; Beusse Wolter Sanks & Maier, PLLC

(57) ABSTRACT

A method of storing data indicating a property of a communications network includes obtaining a data item associated with at least part of a spatial region and having an associated spatial parameter and an associated temporal parameter, the stored data item indicating a property of the communications network. The method also includes receiving second data indicating a property of said communications network at a particular location in said spatial region at a particular time. The method further includes processing said spatial parameter, said temporal parameter, data indicating said particular location and data indicating said particular time and, based upon said processing, generating first and second sub-data items, each of said first and second sub-data items having an associated spatial parameter and an associated temporal parameter, at least one of the first and second sub-data items having a spatial or temporal parameter different from that associated with the stored data item.

18 Claims, 6 Drawing Sheets

(52) U.S. Cl.
CPC ........ *H04W 64/006* (2013.01); *H04W 84/005* (2013.01)

(58) Field of Classification Search
CPC ..... H04W 8/24; H04W 24/02; H04W 52/245; H04W 52/285
See application file for complete search history.

(56) References Cited

U.S. PATENT DOCUMENTS

| | | |
|---|---|---|
| 8,856,184 B1 | 10/2014 | Udeshi et al. |
| 2007/0230420 A1 | 10/2007 | Bumiller et al. |
| 2011/0136503 A1 | 6/2011 | Sridhara et al. |
| 2011/0286437 A1 | 11/2011 | Austin et al. |
| 2011/0310866 A1 | 12/2011 | Kennedy et al. |
| 2012/0196644 A1 | 8/2012 | Scherzer et al. |
| 2013/0339353 A1 | 12/2013 | Emmelmann et al. |
| 2014/0003261 A1 | 1/2014 | Gillett et al. |
| 2015/0358834 A1* | 12/2015 | Cronin ................. H04W 24/02 455/452.1 |

* cited by examiner

COMMUNICATIONS SYSTEM AND METHOD

CROSS-REFERENCE TO RELATED APPLICATIONS

This application claims the benefit of United Kingdom Application No. 1505500.7 filed Mar. 31, 2015, and is incorporated herein by reference in its entirety.

TECHNICAL FIELD

The present invention relates to a communications system, and method of its operation. The present invention may have particular, but not exclusive, application for controlling the communications between a vehicle and a fixed network.

DESCRIPTION OF RELATED ART

With the increased portability of computers, and the increasing sophistication of mobile devices such as mobile telephones and "tablet" computers, there is a growing demand for connectivity while on the move allowing, for example, connection with other devices, and the Internet. While the speed of mobile telecommunications is now such that many networking applications, such as Web access and video streaming are feasible over mobile networks, other factors may limit the utility of mobile networks. For example mobile networks may suffer from incomplete geographic coverage. The problem of incomplete geographic coverage may be particularly problematic when a user is moving, given that data communication may be interrupted when a signal is lost (for example when a train enters a tunnel).

The limitations of systems based upon the connection of mobile devices to mobile telephone networks has led to the proposal that public transport vehicles, such as trains or buses, may be beneficially provided with wireless access points, such that mobile computing devices used by passengers traveling in the vehicle can be provided with data connectivity. More power is available on the vehicle than on a mobile computing device, meaning that systems fitted to vehicles can generally support larger, higher gain antennas than those that are generally installed in portable user devices such as mobile telephones. Furthermore, greater computational power can be used in signal processing in a device associated with a vehicle given that there is room for larger, more powerful processing devices.

It is known for vehicles to connect to base stations along a known route, for example alongside a train track. The base stations may be placed specifically for vehicles travelling along that route, or may be base stations of mobile network operators. It is further known for the vehicle to connect, via the connected base stations, to a home server. The home server may be connected to the Internet via standard means, for example via cable or via a digital subscriber line (DSL). A communication control unit is placed on the vehicle. As the vehicle travels along the route, the communication control unit wirelessly connects to a particular base station. In this way, the communication control unit can connect to the Internet through the home server, routed via the base stations and any intermediate devices in the network. The communication control unit is adapted to distribute the Internet connection to devices within the vehicle, allowing users to connect to the Internet whilst on-board the vehicle.

One solution proposed to overcome incomplete geographic coverage for vehicular data connectivity provision is for vehicles to carry, or have access to, a large number of subscriber identity modules (SIMs) or other means for accessing and authenticating on different mobile networks. In this way, different SIMs can be used in different areas, thereby enhancing connectivity provision. Further, the connectivity of particular mobile networks, as provided by one or more network operators, may vary geographically. For example, a 4G network may be provided in only selected geographical locations by a particular network operator, while a 3G network may be provided by the same network operator across a greater geographical area. As such, when travelling between different geographical areas, a communication control unit may have the ability to switch between different network protocols, so as to maintain the best available data connection. For example, when in a 3G only area, a device may use a 3G network, however, when in an area which is provided with both 3G and 4G networks, a device will preferably use a 4G network.

However, while it is common for devices to seek a 3G network when an established 4G network connection is lost, such a device may remain connected to a 3G network in spite of a 4G network again becoming available. This is disadvantageous because the 4G network, which provides greater bandwidth, is not used. In known devices which are capable of both 3G and 4G network operation, a device connected to a 3G network may be periodically power-cycled, or temporarily disconnected, so as to force a full network availability search to be conducted. However, such a procedure may result in significant periods of lost connectivity, and cannot guarantee an improved data connection as a result.

BRIEF SUMMARY

It is an object of an embodiment of the present invention to obviate or mitigate one or more of the problems set out above.

According to a first aspect of the invention there is provided a method of storing data indicating a property of a communications network. The method comprises obtaining a stored data item associated with at least part of a spatial region and having an associated spatial parameter and an associated temporal parameter. The stored data item indicates a property of the communications network. The method further comprises receiving second data indicating a property of said communications network at a particular location in said spatial region at a particular time and processing said spatial parameter, said temporal parameter, data indicating said particular location and data indicating said particular time. The method further comprises, based upon said processing, generating first and second sub-data items, each of said first and second sub-data items having an associated spatial parameter and an associated temporal parameter, at least one of the first and second sub-data items having a spatial or temporal parameter different from that associated with the stored data item.

By processing spatial and temporal parameters associated with a stored data item, and data indicating a particular location and time associated with received second data, it is possible to determine whether or not the stored data item provides a sufficiently accurate indication of a property of a communications network at the particular location and time. Where a stored data item relates, for example, to a substantially different location and/or substantially different time to that associated with received second data (i.e. the particular location and/or time), it is possible to 'divide' the stored data item so as to generate a plurality of sub-data items, each of which is more accurately representative of a particular location and/or time. In this way, the spatial and/or temporal resolution of stored data can be increased based upon the receipt of further data, but only where necessary, and/or where further data is available, thus providing efficient method of maintaining data representative of a spatial region at a plurality of times without requiring uniform data density. Where only sparse data is available (either temporally or spatially), this can be effectively generalised so as to represent adjacent spatial regions or times until more appropriate data becomes available.

Said generating said first and second sub-data items may comprise determining a spatial relationship between said spatial parameter and data indicating said particular location, determining a temporal relationship between said temporal parameter and data indicating said particular time, and generating said first and second sub-data items if at least one of said determined spatial relationship and determined temporal relationship satisfy a respective predetermined spatial or temporal criterion.

Said generating said first and second sub-data items may further comprise, if said determined spatial relationship does not satisfy said predetermined spatial criterion, and said determined temporal relationship does not satisfy said predetermined temporal criterion, updating said stored data item associated with said part of said spatial region based upon said stored data item and said second data.

Where a stored data item relates, for example, to a substantially similar location and/or substantially similar time to that associated with received second data (i.e. the particular location and/or time), it is possible to update the stored data item so as to be more accurately representative of a property of the communications network at the particular location and/or time. For example, by generating an average of the stored data and the received second data, the updated stored data item can accurately represent the property of the communications network. Alternatively, where received data is inconsistent with stored data, one or both of the received and stored data may be disregarded. In this way, the quality of stored data can be improved based upon the receipt of further data.

Said generating said first and second sub-data items may comprise: if said determined spatial relationship satisfies said predetermined spatial criterion, and said determined temporal relationship does not satisfy said predetermined temporal criterion, generating said first and second sub-data items, said first sub-data item being associated with said spatial parameter and said temporal parameter, and said second sub-data item being associated with said data indicating said particular location and said temporal parameter.

Said generating said first and second sub-data items may comprise: if said determined spatial relationship does not satisfy said predetermined spatial criterion, and said determined temporal relationship satisfies said predetermined temporal criterion, generating said first and second sub-data items, said first sub-data item being associated with said spatial parameter and said temporal parameter, and said second sub-data item being associated with said spatial parameter and said data indicating said particular time.

Said generating said first and second sub-data items may comprise: if said determined spatial relationship satisfies said predetermined spatial criterion, and said determined temporal relationship satisfies said predetermined temporal criterion, generating said first and second sub-data items, said first sub-data item being associated with said spatial parameter and said temporal parameter, and said second sub-data item being associated with said data indicating said particular location and said data indicating said particular time.

The generated first and second sub-data items may each represent a different part of said spatial region and may each be associated with said temporal parameter.

The generated first and second sub-data items may each represent said part of said spatial region and may each be associated with a different temporal parameter.

Said generating first and second sub-data items may comprise: processing said stored data item indicating a property of the communications network, and said second data indicating a property of said communications network; and generating said first and second sub-data items based upon said processing.

Said processing may comprise: comparing said stored data item indicating a property of the communications network, and said second data indicating a property of said communications network; and generating said first and second sub-data items if said comparison satisfies a predetermined criterion.

Said generating said first and second sub-data items may comprise: generating four sub-data items, the four sub-data items together representing said spatial region and each representing a sub-region of said spatial region; wherein a first of said four sub-data items is said first sub-data item and a second of said sub-data items is said second sub-data item; and wherein a third of said sub-data items and a fourth of said sub-data items are each based upon at least one of said first and second data.

Said four sub-data items may each represent a sub-region of approximately equal size.

Said predetermined temporal criterion may be selected from the group consisting of: a criterion based upon a time of day; a criterion based upon a day of the week; a criterion based upon one or more months of the year; and a criterion based upon a reoccurring temporal event.

Said property of said communications network may be selected from the group consisting of: an indication of a communications protocol in a particular spatial region; an indication of a communications protocol provided by a particular communications network in a particular spatial region; an indication of a signal strength; an indication of network speed; an indication of the availability of one or more networks; an indication of a signal to noise ratio; and indication of data throughput.

Said first data may be received from a first device and said second data may be received from a second device.

Said first and second devices may be associated with respective first and second vehicles.

The method may further comprise: generating at least one data structure comprising data indicative of each of a plurality of data items, and sub-data items associated with a spatial region, and transmitting at least part of said generated data structure to a communications device.

According to a second aspect of the invention there is provided a method of operating a communications system. The communications system comprises a data structure comprising a plurality of data items, each data item being indicative of a property of a communications network in a respective spatial region and has a respective associated temporal parameter. The method comprises receiving, at a communications device, at least one of said plurality of data items based upon the location of the communications device and/or a temporal parameter; establishing, by the communications device, at least one connection with the communications network based upon said at least one received data item; generating, by the communications device, data related to the established connection; and updating the data structure based upon the generated data.

Said receiving may be based upon a result of a comparison between said temporal parameter and temporal parameters associated with respective ones of said data items.

Said temporal parameter may be based upon a parameter selected from the group consisting of a time of day; a day of the week; one or more months of the year, and a reoccurring temporal event.

Establishing at least one connection with the communications network may comprise identifying at least one property of the communications network based upon said at least one data item and establishing the connection based upon said at least one property.

The method may comprise, when a connection is established between a communications device and a first data network, if the received data item indicates a first property, attempting to establish a connection with a second data network, and if the received data item indicates a second property, maintaining the established connection with the first data network.

Generating data related to the established connection may comprise monitoring a property of the communications signal and processing the monitored property so as to generate data indicative of the monitored property.

The communications device may be arranged to generate data related to the established connection.

According to a third aspect of the invention there is provided a method of storing data indicating a property of a communications network. The method comprises obtaining a stored data item associated with at least part of a spatial region and having an associated spatial parameter, the stored data item indicating a property of the communications network; receiving second data indicating a property of said communications network at a particular location in said spatial region; and processing said spatial parameter and said particular location and, based upon said processing, generating first and second sub-data items, each of said first and second sub-data items having an associated spatial parameter, one of the first and second sub-data items having a spatial parameter different from that associated with the stored data item.

According to a fourth aspect of the invention there is provided a method of operating a communications system. The communications system comprises a data structure comprising a plurality of data items, each data item being indicative of a property of a communications network in a respective spatial region. The method comprises receiving, at a communications device, at least one of said data items based upon the location of the communications device; establishing, by the communications device, at least one connection with the communications network based upon said at least one received data item; generating, by the communications device, data related to the established connection; and updating the data structure based upon the generated data.

More generally, it will be appreciated that aspects of the present invention can be implemented in any convenient way including by way of suitable hardware and/or software. For example, a device arranged to implement the invention may be created using appropriate hardware components. Alternatively, a communications system may be arranged to perform a method according any of the first to fourth aspects of the invention. In a further alternative, a programmable device may be programmed to implement embodiments of the invention. The invention therefore also provides suitable computer programs for implementing aspects of the invention. Such computer programs can be carried on suitable carrier media including tangible carrier media (e.g. hard disks, CD ROMs and so on) and intangible carrier media such as communications signals.

It will be appreciated that features presented in the context of one aspect of the invention in the preceding and following description can equally be applied to other aspects of the invention. For example, features described with reference to the first aspect of the invention can be used with any of the second to fourth aspects of the invention as appropriate. Similarly, features described with reference to the second aspect of the invention can be used with any of the first, third and fourth aspects of the invention as appropriate.

BRIEF DESCRIPTION OF DRAWINGS

Embodiments of the present invention are now described, by way of example only, with reference to the accompanying drawings, in which.

DETAILED DESCRIPTION

Figure 1:
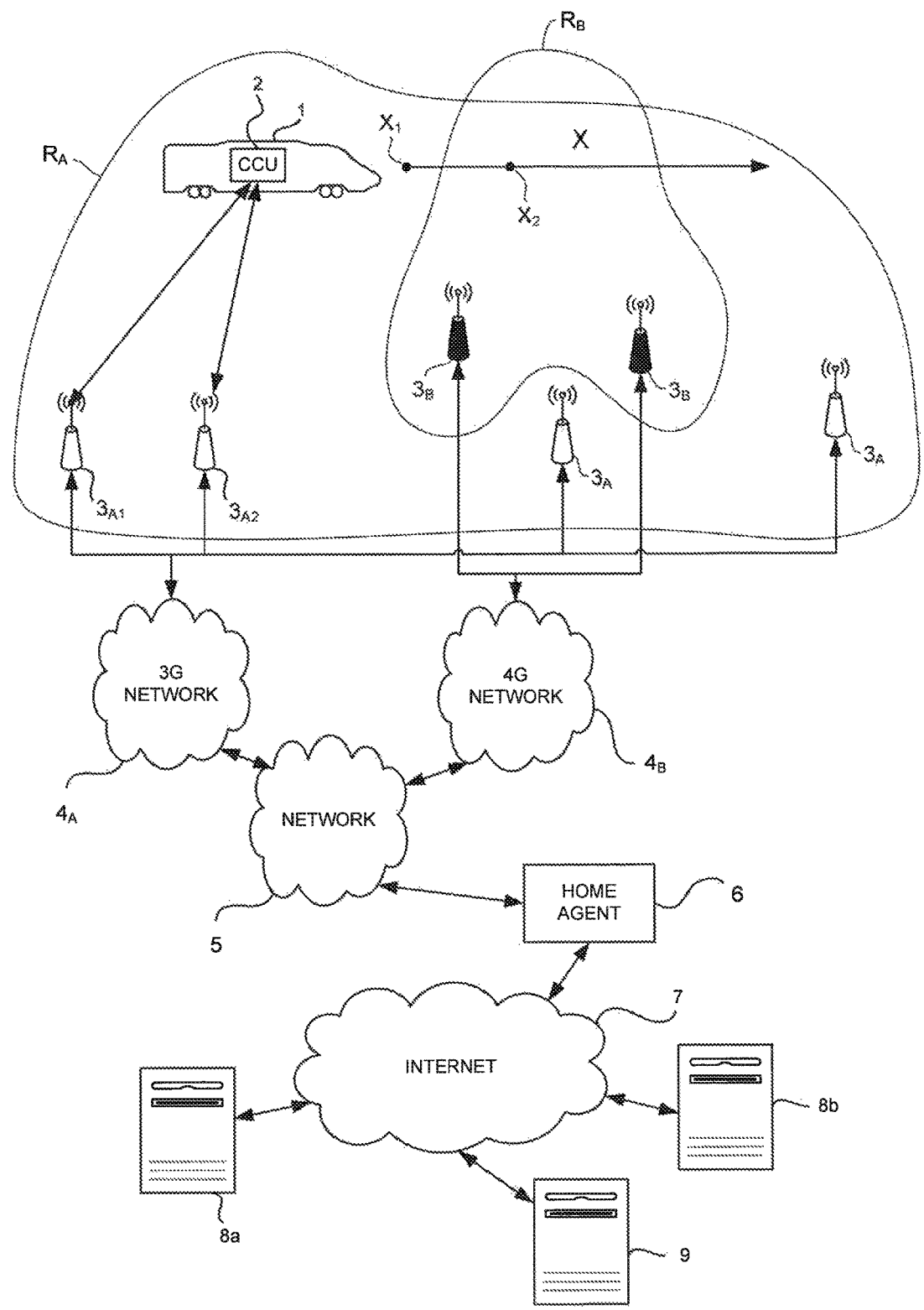
FIG. 1 is a schematic representation of a network of devices in accordance with one aspect described herein.

FIG. 1 shows a train 1 which is provided with a communications control unit (CCU) 2. The CCU 2 is arranged to connect to base stations 3A, 3B. The base stations 3A are connected to a first network 4A, and are arranged to communicate via a first wireless communications protocol. The base stations 3B are connected to a second network 4B, and are arranged to communicate via a second wireless communications protocol. The first and second wireless communications protocols may, for example, be 3G and 4G respectively. In general, the first and second wireless communications protocols may be any radio access technology, for example, as described in more detail below.

The CCU 2 can be used to provide data communication to devices aboard the train 1. Both the CCU 2 and the base stations 3A, 3B are provided with wireless communications interfaces to allow a wireless connection to be established between the CCU 2 and the base stations 3A, 3B. The networks 4A, 4B are each connected to a further network 5.

A home agent 6 is also connected to the network 5. It will be appreciated that while in the example embodiment of FIG. 1, only a single home agent 6 is provided, in other embodiments multiple home agents may be provided. The CCU 2 may connect to one home agent in some circumstances (such as geographical proximity), and another home agent in other circumstances, or may connect to multiple home agents at the same time.

The home agent 6 is connected to the Internet 7. Host computers 8a, 8b are also connected to the Internet 7. A server 9 is also connected to the Internet 7. The CCU 2 is arranged to provide wireless network connectivity on board the train 1. In this way passengers travelling on the train 1 can use mobile computing devices (such as laptop and tablet computers, for example) to connect to the CCU 2 and thereby obtain access to the Internet 7. The connection between the mobile computing devices and the CCU 2 can take any suitable form, but may, for example, be in accordance with IEEE standard 802.11 (Wi-Fi).

It will be appreciated that while FIG. 1 shows each of the base stations 3A, 3B connected to networks 4A, 4B, they may instead be connected directly to a single network. Further, while it is described that the networks 4A, 4B support 3G and 4G communications protocols respectively, they may use different radio access technologies. Further, while the Internet 7 and the network 5 are shown separately in FIG. 6, the network 5 may be connected to, and may at least partly include, the Internet 7.

The geographical arrangement of the base stations 3A, 3B, and the range of communications signals provided by those base stations 3A, 3B results in there being regions in which each of the first and second wireless communications protocols are available. That is, each base station 3A, 3B has a finite area within which it can receive and transmit data. For example, the first wireless communications protocol may be available in a first region RA, and the second wireless communications protocol may be available in a second region RB.

As the train 1 moves in the direction shown by the arrow X, it will pass through regions RA and RB. It will be appreciated that the regions RA and RB are not mutually exclusive. However, the neither of the regions RA and RB extend infinitely. That is, in a first location X1 which is within the region RA, but not the region RB, the train may be able to establish a wireless connection with the network 4A, via the base stations 3A, using the first wireless communications protocol, but not the second wireless communications protocol. However, in a second location X2 which is within both of the regions RA, RB, the train may be able to establish a wireless connection with the network 4A, via the base stations 3A, or the network 4B, via the base stations 3B, using the first wireless communications protocol or the second wireless communications protocol respectively.

Further, as the train 1 moves in the direction shown by the arrow X, the CCU 2 connects to different ones of the base stations 3A or 3B, maintaining a connection to the respective network 4A or, 4B. It is thus preferred that the finite areas within which the base stations 3A, 3B can receive and transmit data overlap, such that there is a time during travel of the train 1 during which the train 1 is able to communicate with more than one of the base stations 3A, 3B which are connected to a particular one of the networks 4A, 4B. In FIG. 1, the train 1, and therefore the CCU 2 is illustrated within the signal range of both of the base stations 3A1 and 3A2 and is connected to both of the base stations 3A1, 3A2.

As described above, one or more of the base stations 3A, 3B may connect to mobile networks using GSM (Global System for Mobile Communications) based technologies such as UTMS and HSDPA networks. As is well known in the art, GSM based networks require users to authenticate themselves on the network using a Subscriber Identity Module (SIM). The CCU 2 therefore comprises suitable components to allow connection to, and authentication on, GSM networks. The CCU 2 may comprise suitable components to allow connection to, and authentication on, multiple different GSM networks, and/or to authenticate differently on a single GSM network. For example, the CCU 2 may be able to make use of a plurality of SIMs.

In use, the train 1, when travelling in the direction shown by arrow X, will experience times at which only 3G connectivity is available (via base stations 3A and network 4A), and other times at which both 3G and 4G connectivity is available (via base stations 3A, 3B and networks 4A, 4B). When entering the region RB, a 3G connection may already be established between the CCU 2 and the network 4A (via one of the base stations 3A). However, the CCU 2 will not routinely attempt to establish a new connection, for example, with the network 4B when an existing connection is already established. As such, passengers on the train 1 may not be provided with the best possible connection (i.e. a 4G connection). As such, in known techniques a modem within the CCU may be power cycled so as to force the modem to attempt to establish a connection with the network 4B. Further, if, for whatever reason, an established connection with the network 4A is lost, a new connection may be established in preference with the network 4B.

On the other hand, when leaving the region RB when a 4G connection exists between the CCU 2 and the network 4B (via one of the base stations 3B) the 4G connection will be lost. The CCU 2 will thus be forced to attempt to establish a new connection with the only available network 4A.

It will thus be appreciated that in known techniques the CCU 2 may automatically down-grade a connection when forced to, but may not up-grade a connection when it is possible to do so.

It will further be appreciated that the CCU 2 may comprise a plurality of wireless modems each of which may be configured so as to connectable to a plurality of different wireless networks. For example, the modems may each be switchable between the networks 4A, 4B. Alternatively, a first modem may be configured so as to be locked to a particular one of the networks (e.g. 4G network 4B), while a second modem may be configured so as to be switchable between the networks 4A, 4B. Such an arrangement (with a locked modem) would ensure that the locked modem would always attempt to connect to a 4G network, and would never maintain a connection to 3G network when a 4G network was available. However, such an arrangement would cause potential loss in network connectivity when a 4G network was not available, with the locked modem being unable to connect to a 3G network and to carry data over the best available network. As such, the system described above would potentially be wasteful of network resources.

In an embodiment, knowledge of previously established network connections in a particular location is used to improve the use of network resources on the train 1. In particular, the CCU 2 periodically reports on its connection status to the server 9, allowing the server 9 to provide information to the CCU 2 which enables the CCU 2 to make informed decisions a regarding the likely availability of improved network connections. Moreover, the knowledge of previously established network connections in a particular location by a large number of trains may be used to improve the use of network resources on the train 1, as described in more detail below. Similarly, the knowledge of previously established network connections in a particular location by the train 1 may be used to improve the use of network resources on other trains when.

Figure 2:
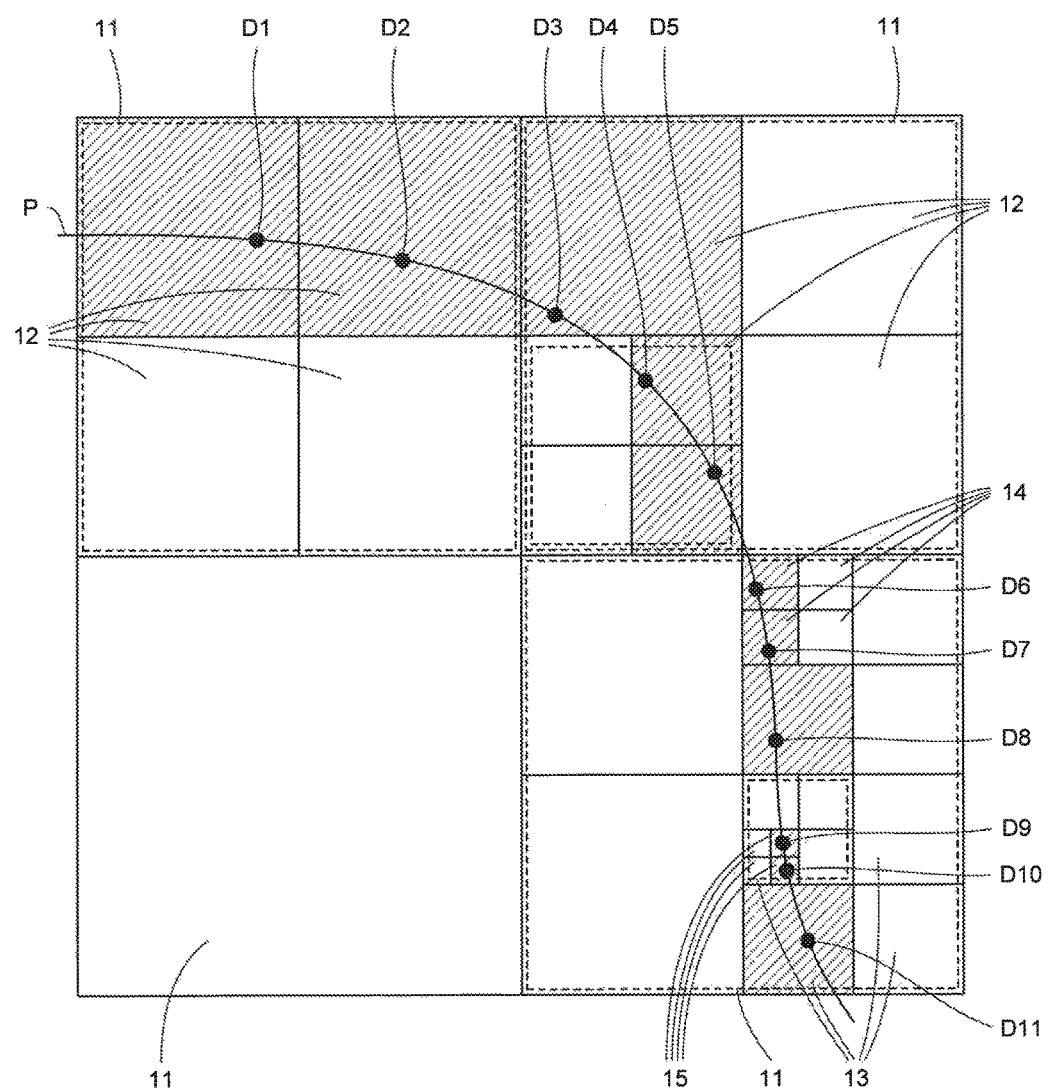
FIG. 2 is a schematic representation of a data structure maintained by a device in the network of FIG. 1.

FIG. 2 shows an example of a data structure 10 which contains data items D1-D11 relating to the availability of networks at a plurality of locations which may be travelled through by the train 1. The data items DL-D11 are used to provide a local estimate of the status of a network in the relevant region. The data structure 10 is arranged as a two-dimensional array comprising a plurality of cells 11. The data structure 10 may take the form of a "k-d tree". Where a two dimensional data structure is used to represent two dimensional space the data structure may take the form of a "quadtree" (i.e. a k-d tree having two dimensions).

Each of the cells 11 is configured to store data relating to a particular spatial region. That is, the k-d tree data structure is representative of a region of space through which trains are expected to travel, with each of the cells of the k-d tree being representative of a sub-region within that region of space. Each of the cells 11 may be further subdivided into sub-cells 12 where additional spatially resolved data D1-D11 is available. That is, where there is only one data item available having a location within a particular spatial region, that data item is used to represent the entire cell 11 (and thus the entire spatial region). However, where additional data points are available within the spatial region which corresponds to the cell 11, the cell 11 may be subdivided so as to allow the most appropriate data to be used to represent the spatial region associated with that sub-cell. For example, data items D1 and D2 both correspond to locations within a single cell 11 which corresponds to the upper-left quadrant of the data structure 10. Therefore, the cell 11 is sub-divided into four sub-cells 12. Data item D1 is then used to represent a spatial region associated with a first sub-cell 12 (the upper-left quadrant of the upper-left quadrant of the data structure 10), while data item D2 is used to represent a spatial region associated with a second sub-cell 12 (the upper-right quadrant of the upper-left quadrant of the data structure 10). Sub-cells 12 may themselves be further sub-divided into sub-sub-cells 13, and so on. Sub-cells may also be referred to as cells, and contain equivalent data to that of a cell, albeit with a smaller associated spatial region. The data structure shown in FIG. 2 is shown with five such levels of cell division (cells 11, 12, 13, 14, and 15). In a k-d tree, each cell may be recursively divided into four sub-cells.

Thus where sparse data is available relating to the availability (or otherwise) of network connectivity, each cell may represent a large spatial region. However, where data is available with a greater spatial resolution, a denser data structure contains cells each of which represent a smaller spatial region. Where no data is available for a particular spatial region, a cell representing that region may, for example, be provided with a "NULL" or "0" value until appropriate data becomes available. Data items are thus generalised to the extent that they can be while not conflicting with other data items so as to enable maximum spatial coverage to be achieved with the available data.

Figure 3A:
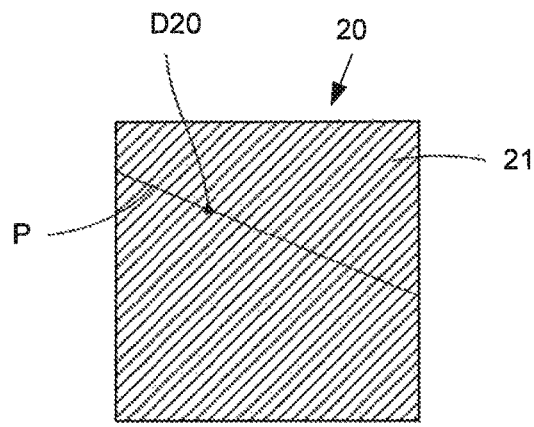
FIGS. 3A-D are a schematic representation of a series of data structures generated by processing carried out by part of the system shown in FIG. 1.
Figure 3B:
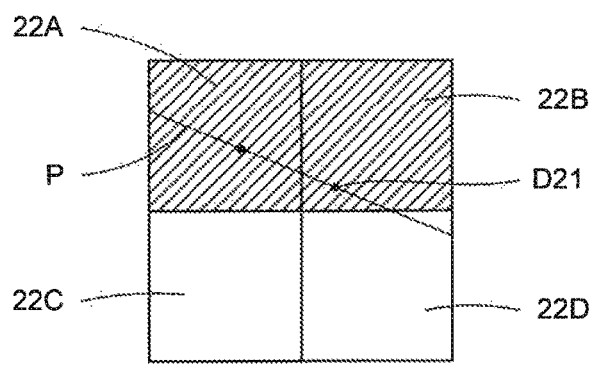

The CCU 2 on the train 1 travelling along a path P may generate periodic updates of the status of a connection to one or more networks. In this way, the data structure 10 is populated. This process is further described with reference to FIG. 3A. A first data item D20 is provided by the CCU 2. The data item D20 may, for example, contain information relating to the current location of the train 1, the status of any established network connections, the strength of any available network signals, the current time, the date, and so on. The generation and contents of the data item D20 is described in more detail below. Having received the data item D20, a data structure 20 is initialised having a single cell 21. The data item D20 is thus used to provide information for all locations corresponding to the cell 21 (i.e. for the entire spatial region represented by the cell 21). As the train 1 moves along its path P, the CCU 2 provides a second data item D21, as shown at FIG. 3B. The second data item D21 contains similar data to the first data item D20, with updated values as appropriate. The second data item is transmitted, via the Internet 7 to the server 9 where the data structure 20 is updated. The location of the train 1 when the second data item D21 is generated is also within the spatial region represented by the cell 21. As such, the cell 21 is divided into sub-cells 22A-D. The first data item D20 thus corresponds to a location within the spatial region represented by the cell 22A, while the second data item D21 corresponds to a location within the spatial region represented by the cell 22B.

Figure 3C:
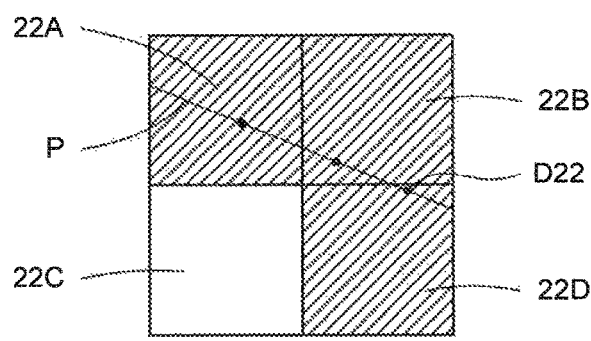

A third data item D22 is subsequently generated by the CCU 2. This situation is shown at FIG. 3C. The third data item D22 contains similar data to the first and second data items D20, D21, with updated values as appropriate. The location of the train 1 when the third data item D22 is generated is within the spatial region represented by the cell 22D.

Figure 3D:
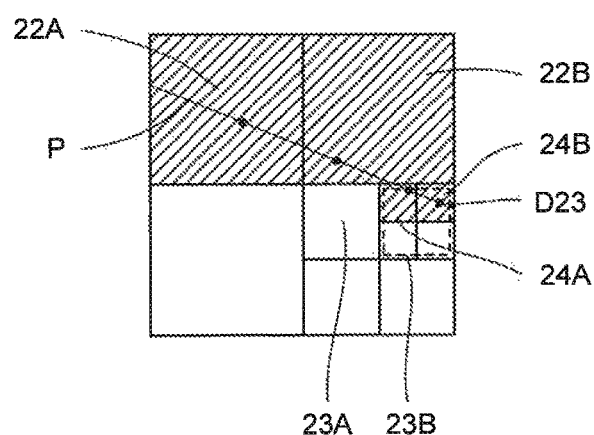

A fourth data item D23 is subsequently generated by the CCU 2. This situation is shown at FIG. 3D. The fourth data item D23 contains similar data to the first to third data items D20 to D22, with updated values as appropriate. The location of the train 1 when the fourth data item D23 is generated is also within the spatial region represented by the cell 22D. As such, the cell 22D is divided into sub-cells 23A-D. However, the location of the train 1 when the third and fourth data items D22, D23 are generated are within the spatial region represented by the cell 23B. As such, the cell 23B is divided into sub-cells 24A-D. The sub-cell 24A is thus provided with the third data item D22, and the sub-cell 24B is provided with the fourth data item D23.

More generally, where two or more data items relate to locations which are within a spatial region associated with a single cell, a location conflict may be considered to exist. Where two such data items provide conflicting indications of a communications signal, uncertainty may be caused as to which of the data items is representative of the communications signal within the spatial region. As such, when a location conflict exists, a spatial region (and associated data structures) may be divided, so as to allow only the most spatially relevant data to be used to indicate a property of a communications signal.

Further, it will also be appreciated that two or more data items having similar, but not identical, locations may be determined to be sufficiently close to one another that they are determined to have the same location. Where such multiple data items having the same location (whether identical or sufficiently close) exist, some form of data aggregation may be used. That is, a cell and corresponding sub-region may not be sub-divided indefinitely—a minimum sub-region dimension may be applied—and multiple data items having similar locations may be associated with a single sub-region (rather than each having their own sub-region). Any location within the sub-region may be considered to be the same, for the purposes of any data relating to that sub-region.

A minimum sub-region dimension may, for example, be determined by positional accuracy of GPS location data. Further, a minimum sub-region dimension may, for example, be determined by the use of network multi-paths, which may introduce significant network performance differences at small region dimensions. Reductions in the minimum sub-region dimension may cause performance instability due variations in cell boundary conditions (e.g. the effective range of a base station). Further, reductions in sub-region dimension would increase the memory required to store the data-structures associated with each sub-region, and would also increase the time required to retrieve data from the various data-structures.

Further still, where a train is travelling at speed, a timing error may exist between when a new network technology is detected, and when a GPS location is recorded. Such a timing error may cause some uncertainty in the exact boundary of a given radio access technology. Furthermore, even where a train is static, there may be variations in available radio access technologies caused by external factors (e.g. weather, air pressure, temperature, position of other vehicles). Such variations in radio access technology boundaries (whether real, or perceived) may cause significant data accuracy issues if the minimum sub-region dimension is too small.

A sub-region may have a minimum dimension which is configurable. A minimum dimension of, for example, around 50 m, or around 100 m, may provide a reasonable compromise between spatial accuracy, data reliability, and data storage and access requirements. A sub-region having a minimum dimension of 50 m would provide 20 data structure sub-regions per each 1 km of track.

In normal use, a CCU may maintain several connections with different networks at any given time. For example, a CCU may comprise between 4 and 12 modems, allowing different modems to connect to different networks at any given time, so as to reduce the likelihood of a total loss of connectivity should a connection with a single network, a single radio access technology, or a single network operator fail. Such use of multiple networks allows for one or more modems to be caused to scan for a new radio access technology while a stable connection is maintained using other modems.

It has also been realised that where multiple data items exist for a given location which correspond to a single sub-region, historical data may provide less accurate information regarding the current availability of the radio access technology than more recent data. Such a phenomenon may be attributed to the above mentioned influence of various external factors on available radio access technologies.

In this way, the data structure 20 is divided and sub-divided to the extent that is necessary to accommodate each of the data items D20-D23. Processing which is carried out on the server 9 to generate the data structure 20 shown in FIGS. 3A-D is now described with reference to FIG. 4.

Processing is initiated at step S1 when the first data item D20 is received by the server 9 from the CCU 2. Processing then passes to step S2, where the location data within the data item D20 is compared to location data of existing data items within the data structure 20 to determine whether a location conflict exists. Being the first data item to be received ensures that no such existing data items exist, therefore processing passes to step S3 where the data item D20 is added to the data structure 20 as cell 21, representing the entire spatial region covered by the data structure 20.

When the second data item D21 is received by the server 9 from the CCU 2 processing is once again initiated at step S1. Processing then passes to step S2, where the location data within the data item D21 is compared to location data of existing data items within the data structure 20. It is then established that the locations associated with both of the data items D20 and D21 are contained within the spatial region represented by cell 21, and thus a location conflict exists. Processing then passes to step S4, where the cell 21 is divided into cells 22A-D. The first data item is assigned to the most appropriate cell, which in this case is 22A. Processing then returns to step S2, where the location data within the data item D21 is again compared to location data of existing data items within the data structure 20. It is then established that no further location conflict exists, and processing therefore passes to step S3 where the data item D21 is added to the data structure 20 at cell 22B.

When the third data item D22 is received by the server 9 from the CCU 2 processing is once again initiated at step S1. Processing then passes to step S2, where the location data within the data item D22 is compared to location data of existing data items within the data structure 20. It is then established that no location conflict exists, and processing therefore passes to step S3 where the data item D22 is added to the data structure 20 at cell 22C.

When the fourth data item D23 is received by the server 9 from the CCU 2 processing is once again initiated at step S1. Processing then passes to step S2, where the location data within the data item D23 is compared to location data of existing data items within the data structure 20. It is then established that the locations associated with both of the data items D22 and D23 are contained within the cell 22D, and thus a location conflict exists. Processing then passes to step S4, where the cell 22D is divided into cells 23A-D. The first data item is assigned to the most appropriate cell, which in this case is 23B. Processing then returns to step S2, where the location data within the data item D21 is again compared to location data of existing data items within the data structure 20. It is then established that the locations associated with both of the data items D22 and D23 are contained within the cell 23B, and thus a location conflict exists. Processing then passes again to step S4, where the cell 23B is divided into cells 24A-D. Processing then returns to step S2, where the location data within the data item D23 is once again compared to location data of existing data items within the data structure 20. It is then established that no further location conflict exists, and processing therefore passes to step S3 where the data item D21 is added to the data structure 20 at cell 24B.

Figure 4:
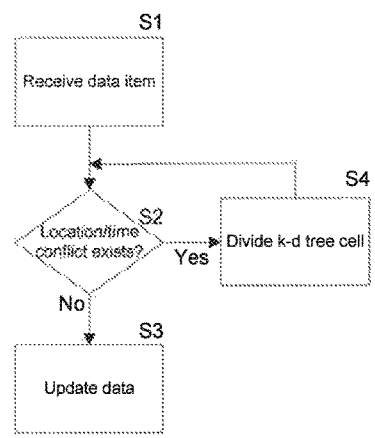
FIG. 4 is a flowchart showing an example of processing that may be carried out by one or more devices implementing an aspect described herein to generate a data structure shown in FIGS. 2 and 3A-D.

The processing described with reference to FIG. 4 occurs each time a new data item is received by the server 9 from the CCU 2.

In general, a cell (and corresponding sub-region) is divided when a new boundary condition occurs. There is no need to differentiate between locations where there is no change in the status of a radio access technology. Further, data relating to networks provided by a particular network provider may be treated separately from that relating to other network providers. It will be appreciated that where the status of a radio access technology provided by a first provider changes, the status of a radio access technology provided by a second provided may not change, and may thus not require cell division. As such, it may prove to be more efficient to maintain separate date structure relating to each of several different network providers than a single data structure.

Further, while the processing described with reference to FIG. 4 makes use only of location data to discriminate between data items, additional contents of the data items can be used to further discriminate between data items as a basis for further division of the data structure 20. For example, temporal data may also be used as an index to the data structure 20. That is, each cell or sub-cell within the data structure 20 maybe further sub-divided on the basis of the time at which the data item was generated. The data structure 20 may thus be considered to have two spatial dimensions and a third, temporal dimension. A data structure having two spatial and a single temporal dimension may take the form of a k-d tree having three dimensions. Alternatively, each cell within the data structure (which is defined in terms of its two spatial dimensions) may have a single temporal dimension which further sub-divides that cell, but which does not affect or cause division of spatially adjacent cells. A data structure may thus be arranged as a k-d tree comprising a three-dimensional array.

Where a train 1 regularly follows an identical route, but at different times of day, different signal conditions may be experienced at those different times. For example, as more devices (e.g. mobile telephones) are connected to a particular base station, the area of coverage provided by that base station is known to be reduced. Such a phenomenon (i.e. diurnal variation) may be known as cell shrinkage. For example, where a single device is connected to a base station, the effective range of the base station may be 1 km. However, where twenty devices are connected to the same base station, the effective range of the base station may be reduced to, for example, 500 m. It will be appreciated, therefore, that where a base station experiences significant changes in the number of devices which are connected to it through a typical day, the effective range of that base station may also fluctuate. In some circumstances a base station may provide 4G coverage to a CCU on a train at some times, but not at others. Knowledge of times at which 4G coverage has previously been provided to a CCU on a train therefore allows the CCU to attempt to connect to a 4G network only when it expects one to be available.

Figures 5A, 5B:
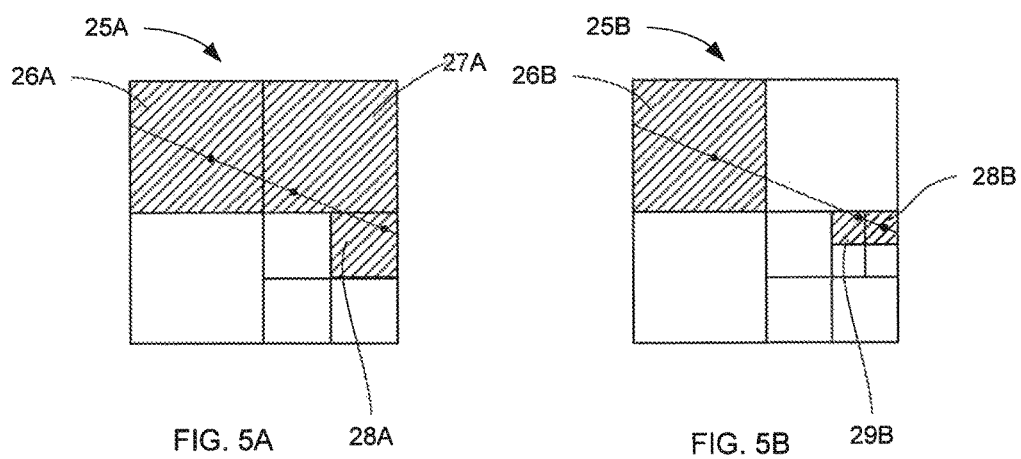
FIGS. 5A and 5B are schematic representations of two data structures generated by processing carried out by part of the system in FIG. 1 each representing a different time period.

FIGS. 5A and 5B illustrate a three-dimensional k-d tree. FIG. 5A illustrates a two-dimensional view of a portion of a k-d tree which is associated with a particular spatial region at a first time of day, while FIG. 5B illustrates a two-dimensional view of a portion of the same k-d tree (which is associated with the same particular spatial region) at a second time of day.

In more detail, a data structure 25A represents the spatial region at particular time of day, for example 12 pm-1 pm. The data structure 25A comprises a plurality of populated cells 26A, 27A, 28A, each of which contains data related to a communications signal in a respective sub-region at the particular time of day. A second data structure 25B, on the other hand, represents the same spatial region as the data structure 25A, but at a different time of day, for example 1 pm-2 pm. The data structure 25B also comprises a plurality of populated cells, 26B, 28B, 29B, each of which contains data related to a communications signal in a respective sub-region at the different time of day. However, it can be seen that different data may be available at different times of day. For example there is no data which corresponds to cell 27A available between 1 pm and 2 pm, meaning there is no cell 27B. Furthermore, it is possible that cells which correspond to the same spatial sub-region (e.g. cells 26A and 26B) contain different information regarding the communications signal, due to the fact that both cells relate to different time periods.

Further, this effect may also be observed on different days of the week. For example, a base station which is proximate to an office building may provide connectivity to many users of that office building during normal working hours (and suffer from cell shrinkage as a result). However, during early mornings, evenings, nights and weekends fewer users may be connected, resulting in an increased effective range during those times.

The use of additional (i.e. non-spatial) dimensions or indices to the data structures thus allows logical or statistical methods relating to time to be applied. For example, reference can be made to a calendar, allowing significant reoccurring temporal events (e.g. Christmas, Easter, Bank Holidays) to be identified, and for changes in data traffic (and consequential effects on the effective range of base stations) to be anticipated.

Further, the use of frequency domain analysis of data connectivity patterns (rather than time domain) may allow for repeating patterns related to data connectivity and coverage (e.g. weekdays vs. weekends) to be identified. Such frequency domain analysis could further be used to identify repeating patterns which are only loosely related to a calendar. For example, an identified event (which has some effect on data connectivity) may occur at an arbitrary interval (e.g. every second Tuesday between 6 pm and 8 pm). Further, some events may be identified which have a cyclical period which is not aligned to a particular day of the week, or hour of the day (e.g. the period is not an integer multiple of 24 hours, or 7 days).

In addition to spatial and temporal discrimination between data entries within the data structure, further discrimination may be possible based on the direction of travel of a train which may, for example, affect which set of tracks a train is travelling on (which may, for example be 10-20 meters apart). Further, the direction of travel may affect network signal availability where train mounted antennas are directional.

It is to be understood that the train 1 described above with reference to FIG. 1 may be one train in a fleet of similar trains, each train in the fleet carrying a respective CCU, arranged similarly to that shown in FIG. 1. That is, each train in a fleet may be arranged to provide connectivity to passengers aboard the train by connection to the home agent 6 via a CCU aboard that train. Further, each of the trains may provide data to, and retrieve data from a central data structure as illustrated by FIG. 2. A single central data structure can therefore be built and updated based upon data generated by an entire fleet of trains, rather than being restricted to data generated by a single train. A distributed self-learning system is thus provided to enable efficient usage of network resource. By allowing CCUs to attempt to connect to a faster network when, and only when, it is likely that such a network is available unnecessary downtime (e.g. periodic polling for 4G network availability) can be reduced.

Figure 6:
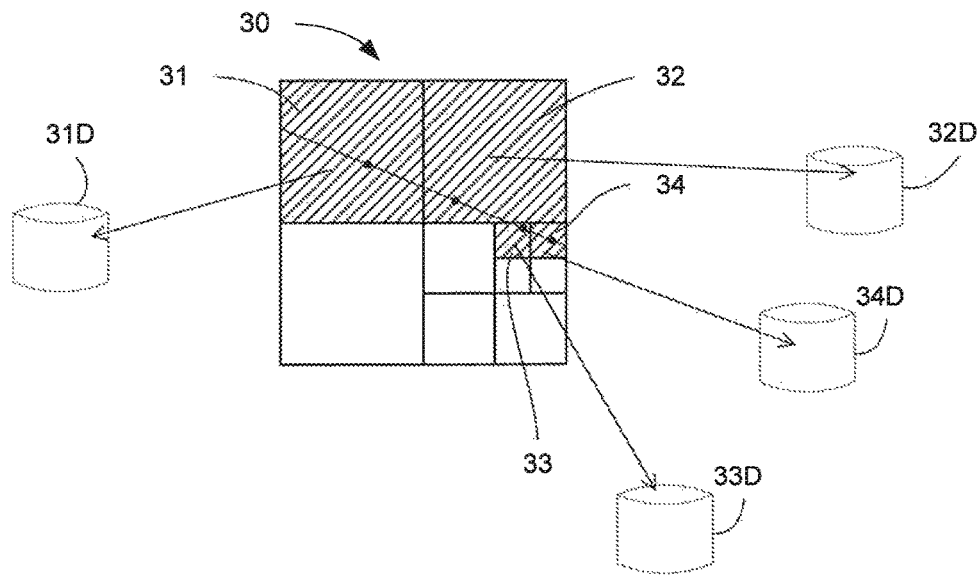
FIG. 6 is a schematic representation of a data structure generated by processing carried out in FIG. 4.

The server 9 maintains a data structure which contains all of the information provided by the CCUs. It will be appreciated that the exact form of the data structure may be other than that illustrated in FIGS. 2 and 3. For example, each cell of the k-d tree data structure may contain a pointer to a further data structure which contains all of the data which is associated with that cell. In such a way, a plurality of data structures are maintained by the server, along with a set of relationships the interactions between those data structures. FIG. 6 illustrates such an arrangement. Data structure 30 is an example of a k-d tree data structure, as described above. Each populated cell in the data structure 30 (that is, each cell with which there is associated location specific data), contains a pointer to a further data structure such as a database. The data structure 30 contains four such populated cells, cells 31 to 34. There are, therefore, four associated databases 31D-34D, each of which contains data items associated with a respective geographical location (represented by a respective one of the cells 31 to 34). When an additional cell is created, by the division of an existing cell (as described above with reference to FIG. 4) an additional database is created, and a pointer to said database stored within the data structure 30.

Further discrimination between data entries within a data structure may be possible based on the identity of the train (and thus CCU). In this way different network availabilities may be maintained and updated for a particular location for different CCUs.

It will be appreciated that the illustrated k-d tree data structures are just one way of representing the data structures used in embodiments of the invention. The data structure may be arranged in any convenient way. Further, data structures such as databases which are referred to above may have their own structures for the organisation of data such as, for example, tables and records. Further, such structures (e.g. tables and records) may themselves be divided and sub-divided as the data structures are updated in use. That is, both the structure and content each of the data structures referred to above may be update dynamically. New cells, pointers, tables, records (and so on) may be added to the various data structures to accommodate new data, and to re-organise existing data, as necessitated by the receipt of new data.

As mentioned above, the train 1 (or each of the fleet of trains) provides periodic updates of the location of the train 1 and the status of any connections established with networks to the server 9. The periodic updates are transmitted to the server 9 via one of the networks 4A, 4B. Each of these updates comprises data which may, for example, contain one or more of: information relating to the signal-to-noise ratio (SNR) of any signal received from a base station to which the CCU 2 is connected; received signal strength indication (RSSI) data which provides a measurement of the power present in a signal received from a base station; time stamp data identifying when the data was collected; radio access technology data identifying the currently connected radio access technology; data identifying a particular base station to which it is connected (cell ID), CCU ID identifying the particular CCU which is providing the update; the direction of travel of the train. The updates may additionally or alternatively comprise data based on analysis of the number of user devices connected to a LAN provided by the CCU, such as, for example, the number of users currently connected to the CCU or the user throughput. Further, data updates may, for example, comprise data relating to the volume of data transferred by the CCU and/or packet loss statistics and/or statistical data relating to the likelihood of making a particular radio access technology connection or an alternative measure of the likely connection quality (a connection quality index, CQI). Where the collected data is a numerical value (e.g. SNR, RSSI, CQI) an average value may be transmitted. For example, an average (e.g. mean) SNR value over a predetermined period of time may be determined by the CCU 2 and transmitted as part of the data item. Further, the data may contain information relating to the network operator responsible for the network to which the CCU 2 is connected.

The period at which such data is collected and transmitted may, for example, be any convenient period. A convenient data collection period may, for example, be configurable to be between 1 and 10 seconds. The period may be adjusted based upon a speed at which the train 1 is moving, so as to correspond to an approximately equal geographical spacing. It will be appreciated that a train travelling at 200 km/h will cover 100 m in approximately 1.8 s, while a train travelling at 80 km/h will cover 100 m in around 4.5 s. A CCU within a train travelling at below 10 km/h may be configured to provide updates at a fixed period, such as, for example, every 30 s. The period may be adjusted based upon properties of the connection, or contents of previously collected data.

In addition to the processing described above which is carried out in order to transmit data relating to the status of any connections with networks, the CCU 2 further retrieves data relating to the expected status of networks in the area in which the train 1 is located. Such processing is now described with reference to FIG. 7. At step S5, which is performed periodically by the CCU 2, the location, and optionally direction travel, of the train 1 (and hence CCU 2) is detected. The location and direction may be detected by a variety of mechanisms, such as, for example, by reference to satellites (e.g. GPS data).

Processing then passes to step S6 where a data item is retrieved from the data structure stored by the server 9 based upon the detected location. Rather than retrieving the entire data structure (which may contain many data items relating to different locations, and even multiple data items for the relevant location), a data item which contains only information relevant to the particular location is retrieved. For example, the retrieved data item may contain meta-data which is based upon the many data items received from the CCUs and stored within the data structure.

The retrieved data may, for example, contain a statistical likelihood of connecting to a given operator with a particular radio access technology type at that particular location and at that particular time. Processing then passes to step S7 where it is determined what, if any, connections are currently established between the CCU 2 and the networks 4A, 4B. Where at least some established connections are detected, processing passes to step S8 where it is determined whether, on the basis of the received data and established connections, an improved connection setup can be achieved. For example, where a 3G connection is established, but a 4G connection is indicated as being likely to be available, an improved connection setup can be achieved by establishing a 4G connection. If an improved connection setup can be achieved, then processing passes to step S9, where an attempt is made to improve the connection setup. This processing may, for example, involve power-cycling a modem which is connected to a 3G network, so as to force it to attempt to connect to a 4G network which has been determined to be available in that location.

On the other hand, if it determined at step S8 that no improved connection is likely to be available, then processing passes to step S10, where the current connection is maintained.

If, at step S7, it is determined that no connection is established, then processing passes to step S9, where an attempt is made to connect to the best available network, on the basis of the data received at step S6.

In determining whether a particular network connection is likely to be available, a set of rules may be applied by the CCU 2 to the received meta-data. For example, a minimum SNR or RSSI value may be required by a particular modem to maintain a stable network connection. As such, a rule may require that a predetermined margin over than minimum value be maintained at all times, so as to ensure a stable network connection. Therefore, if such a margin is not present, the connection is not deemed to be available. Similarly, where the received meta-data is a statistical likelihood of connecting to a given operator with a particular radio access technology type, a minimum likelihood threshold (e.g. 70%) may be applied before an attempt is made to perform a re-select of radio access technology.

It will be appreciated that different rules may be applied depending on the circumstances and particular data connection requirements of the CCU 2. For example, a plurality of modems within a CCU 2 may each have different associated rules, allowing a connection stability/performance profile to be maintained. That is, it may be preferred to have some connectivity at all times, albeit at a slower than the best available speed, provided that the connection is maintained. Therefore some modems may be maintained on a stable 3G network, while some modems are connected to a less stable 4G network. Such an arrangement setup may reduce the overall data transfer bandwidth (when compared to making 4G connections whenever available), but improve the overall connection stability.

While it is described above that data is retrieved at step S6 from a data structure stored on the server 9, data may instead be retrieved from a data structure stored on the CCU 2 itself. For example, the CCU 2 may be periodically provided with a local data structure which is derived from the data structure stored on the server 9. The local data structure may comprise a k-d tree, with each node containing a scalar value indicative of the probability of achieving a predetermined radio access technology connection in the location associated with each respective node. Alternatively, the local data structure may contain different meta-data as required by the CCU 2 to determine whether an improved connection can be made. The local data structure may be based on data provided by that particular CCU, or based on data from all CCUs (i.e. the entire fleet) when at each respective location. The use of a local data structure stored on a memory associated with a CCU may reduce data access times when compared to frequently accessing a data structure stored on a server. Further, where there is no data connectivity (e.g. when exiting a tunnel, or an area with no network coverage) a local data structure allows a CCU to identify when it is likely to be possible to restore a data connection.

Where a local data structure is maintained, a server based data structure may be provided with regular updates, as described in more detail above. As such the contents of a local and server based data structure may diverge over time. A local data structure may be updated from the server at each reboot or power on of the CCU.

A local data structure for a CCU may additionally comprise data indicating a last reported data access technology used by the respective CCU and/or the date and time of that use.

Figure 7:
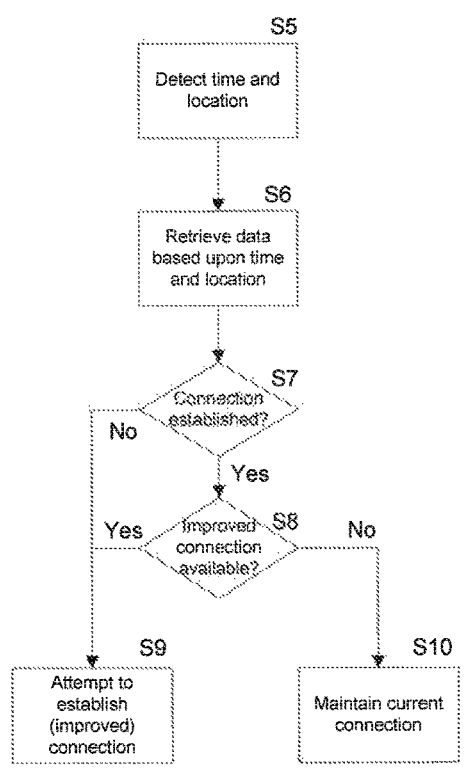
FIG. 7 is a flowchart showing an example of processing that may be carried out by one or more devices implementing an aspect described herein based upon a data structure shown in FIGS. 2, 3A-D, and 5.

It will be appreciated that each of the trains within the fleet of trains may carry out similar processing to that described with reference to FIG. 7.

Processing to extract and distribute appropriate meta-data to each of the trains within a fleet is carried out by the server 9. Such processing may, for example, involved determining which of the data items stored within the databases which are associated with the data structure should be used for the basis of further processing. For example, where several data items contain information relating to a given location, it may be possible to take an average of values within those data items.

In some embodiments statistical processing may be performed on the data allowing, for example, calculation of data throughput for a given area. Such processing may be carried out locally by a CCU, or at a server. Such statistical processing, and associated data storage may be limited by the size of data structures (e.g. data structures 31D-34D) which are provided at each node of a k-d tree. Statistical processing may be based on data provided by a single CCU, a predetermined group of CCUs, or the entire fleet.

Alternatively, or additionally, particular ones of the data items within a data structure may be discarded based upon some predetermined criterion. For example, where a large number of data items provide consistent information relating to the status of a particular signal, but one data item, or small number of data items provide contradictory data, that data item may be discarded.

Further, such contradictory data can be used to detect hardware faults, such as, for example, modem and/or CCU faults. In an embodiment a modem that consistently reports an inability to connect to a 4G network in locations and at times that others modems can connect to such a network may be declared faulty. In such an embodiment a servicing or inspection requirement may be indicated to a system operator. Further, any data items generated by the defective modem may be disregarded until it has been inspected.

Alternatively, such contradictory data may be used as the basis of a further division of the data structure. For example, and as described in detail above with respect to geographical locations, where a location data conflict exists, the cells of the data structure can be divided in order to accommodate higher resolution of spatial data. A similar division operation can be performed based upon other data characteristics, such as, for example, time (also as described above).

Each time a new data item is received from one of the CCUs it is added to an appropriate data structure. Further, when appropriate, data structures are divided. The division of a data structure may, for example, be accomplished by the addition of a flag to an entry within a data structure which identifies a particular subset of entries which belong to a sub-data structure. That is, a single data structure may be maintained which contains several sub-data structures.

It will further be appreciated that a cell does not have to be divided on the receipt of a single additional data item associated with a similar location. In fact, each cell may accommodate a large number of apparently location conflicting data items before a division is caused. For example, as described in more detail above, a cell may contain data relating to a sub-region having a minimum dimension of, for example, 50 m.

As data is captured by a CCU a buffer corresponding to each cell within a data structure may be maintained, each buffer being configured to contain only a single status report relating to each of the networks to which it may be connected. Each status report comprises data relating to the status of a particular network connection, as described in more detail above. For example, a status report may contain the following fields for each network: RSSI, SNR, CQI, current radio access technology, current data throughput, cell ID, and the time at which the data was captured. Each of the status reports contained within the buffers may be based upon a plurality of data entries. For example, each of the status reports may, be based upon the last few status reports (e.g. the last 2 to 8 reports) generated by a CCU. The number of data entries upon which each buffer may be configured, but is preferably kept small to reduce memory usage. The plurality of data entries may be processed in some way so as to reduce the impact of anomalous data entries. For example the data entries within a buffer may be median filtered, such that stray, transient or anomalous data is disregarded. The output of the median filter may then be used to update the statistical data stored within a cell which relates to the relevant location/time/network/CCU and so on.

It will be appreciated that in some embodiments, rather than being stored, location data (such as cell ID) within a status report may be used simply as an index to the data structure within which the status report is stored. Similarly, where temporal data is used to distinguish between data structures (or cells within a data structure) temporal data within a status report may be used as an index to the data structure, rather than being stored.

It will be appreciated that where a CCU reports a lack of coverage of a particular radio access technology, this may result in a reduction in the recorded availability of that radio access technology. However, the use of filtering, as described above, may allow such reported losses in coverage, where transient, to be disregarded. Further, the use of temporally and spatially resolved data entries within the data structure allows a genuine reduction in coverage to be recorded and have impact only to the (spatial and/or temporal) extent that it is relevant.

Of course, while it is described above that embodiments are arranged to switch between 3G and 4G networks, it will be appreciated that embodiments are equally applicable to other radio access technologies. For example, in an embodiment the processing described above is applied to 2G, 3G, 3.5G and/or 4G networks. 2G generally refers to 2nd generation mobile technology, such as, for example, GSM, GPRS, EDGE and CDMA. 3G generally refers to 3rd generation mobile technology, such as, for example, WCDMA, UMTS HSDPA. 3.5G generally refers to technologies such as, for example, HSPA, HSPA+, DC-HSPA+, WiMax and LTE technology allowing data transfer speeds of up to about 100 Mbit/s. 4G generally refers 4th generation "LTE Advanced" technologies allowing data transfer speeds of between about 100 Mbit/s and 1 Gbit/s.

It will be appreciated that different technologies may be referred to by different terms in different territories, possibly in conflict with official standards definitions. For example, LTE technology may be referred to as 4G technology in some territories. Further, HSPA and HSPA+ may be referred to as 3G technologies.

In general, embodiments of the invention may be used to improve switching between slower (i.e. older generation) and faster (i.e. later generation) radio access technologies. Such switching may be referred to as changing, or re-selection of, radio access technology. However, switching may also be improved between equivalent generation technologies. For example, some base stations may permit automatic switching between HSPA, HSPA+ and DC-HSPA+(which may all be referred to as 3.5G), while not permitting automatic switching to LTE (also 3.5G) while a data connection is in use. However, the same base stations may permit switching from LTE to HSPA, HSPA+ and DC-HSPA+ when LTE coverage is lost.

In an embodiment the processing described above may be applied to networks which are provided by different network providers.

Figure 8:
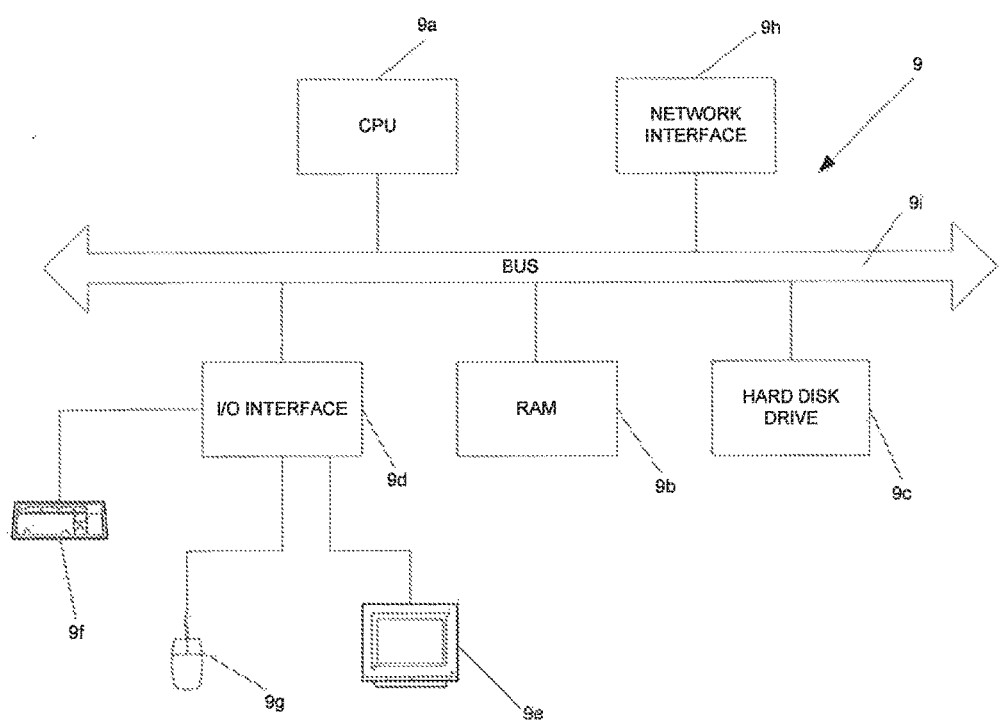
FIG. 8 is a schematic illustration of a computer in accordance with part of the system shown in FIG. 1.

It will be appreciated that the processing described above may be carried out on computers having any convenient structure. FIG. 8 shows the server 9 in further detail. It can be seen that the server comprises a CPU 9a which is configured to read and execute instructions stored in a volatile memory 9b which takes the form of a random access memory. The volatile memory 9b stores instructions for execution by the CPU 9a and data used by those instructions. For example, in use, the data structure 30 may be stored in the volatile memory 9b.

The server 9 further comprises non-volatile storage in the form of a hard disc drive 9c. The data structure 30 may be stored on the hard disc drive 9c. The server 9 further comprises an I/O interface 9d to which are connected peripheral devices used in connection with the server 9. More particularly, a display 9e is configured so as to display output from the server 9. The display 9e may, for example, display a representation of the data structure 30. Additionally, the display 9e may display images or data generated by processing of the data structure 30. Input devices are also connected to the I/O interface 9d. Such input devices include a keyboard 9f and a mouse 9g which allow user interaction with the server 9. A network interface 9h allows the server 9 to be connected to an appropriate network, such as the Internet 7, so as to receive and transmit data from and to other computing devices, such as, for example, CCU 2. The CPU 9a, volatile memory 9b, hard disc drive 9c, I/O interface 9d, and network interface 9h, are connected together by a bus 9i.

It will be appreciated that the CCU 2 may comprise a components arranged in a similar way to the server 9. Further, where processing is described above as being carried out by the CCU 2, or the server 9 it may in fact be carried out by one or more different computing devices.

In some embodiments where data entries contain information relating to data throughput at locations corresponding to each respective data structure cell, and where temporal information is also used to distinguish between data structure cells, it is possible to identify usage patterns. For example, where sub-regions have a similar dimension, the difference between average data throughput for a given network may provide an indication of overall system utilisation. Further, network access problems can be identified in this way. For example, where there is no observed throughput on a given day in a given location, and where that cells relating to that location have recorded throughput on several previous days some form of failure may have occurred. Of course it will also be appreciated that sub-region dimensions may differ for a given location depending on the time or day, and as such, any comparisons between sub-region throughputs should take such a variation into account.

Embodiments of the present invention have been described above and it will be appreciated that the embodiments described are in no way limiting. Indeed, many variations to the described embodiments will be apparent to an ordinary skilled person, such variations being within the spirit and the scope of the present invention.

The invention claimed is:

1. A method of storing data indicating a property of a communications network, the method comprising:
obtaining a stored data item associated with at least part of a spatial region and having an associated spatial parameter and an associated temporal parameter, the stored data item indicating a property of the communications network;
receiving second data indicating a property of said communications network at a particular location in said spatial region at a particular time; and
processing said spatial parameter, said temporal parameter, data indicating said particular location and data indicating said particular time and, based upon said processing, generating first and second sub-data items, each of said first and second sub-data items having an associated spatial parameter and an associated temporal parameter, at least one of the first and second sub-data items having a spatial or temporal parameter different from that associated with the stored data item;
wherein said generating said first and second sub-data items comprises:

determining a spatial relationship between said spatial parameter and data indicating said particular location;

determining a temporal relationship between said temporal parameter and data indicating said particular time; and generating said first and second sub-data items if at least one of said determined spatial relationship and determined temporal relationship satisfy a respective predetermined spatial or temporal criterion.

2. The method according to claim 1, wherein said generating said first and second sub-data items further comprises:
if said determined spatial relationship does not satisfy said predetermined spatial criterion, and said determined temporal relationship does not satisfy said predetermined temporal criterion, updating said stored data item associated with said part of said spatial region based upon said stored data item and said second data.

3. The method according to claim 1, wherein said generating said first and second sub-data items comprises:
if said determined spatial relationship satisfies said predetermined spatial criterion, and said determined temporal relationship does not satisfy said predetermined temporal criterion, generating said first and second sub-data items, said first sub-data item being associated with said spatial parameter and said temporal parameter, and said second sub-data item being associated with said data indicating said particular location and said temporal parameter.

4. The method according to claim 1, wherein said generating said first and second sub-data items comprises:
if said determined spatial relationship does not satisfy said predetermined spatial criterion, and said determined temporal relationship satisfies said predetermined temporal criterion, generating said first and second sub-data items, said first sub-data item being associated with said spatial parameter and said temporal parameter, and said second sub-data item being associated with said spatial parameter and said data indicating said particular time.

5. The method according to claim 1, wherein said generating said first and second sub-data items comprises:
if said determined spatial relationship satisfies said predetermined spatial criterion, and said determined temporal relationship satisfies said predetermined temporal criterion, generating said first and second sub-data items, said first sub-data item being associated with said spatial parameter and said temporal parameter, and said second sub-data item being associated with said data indicating said particular location and said data indicating said particular time.

6. The method according to claim 1, wherein the generated first and second sub-data items each represent a different part of said spatial region and each are associated with said temporal parameter.

7. The method according to claim 1, wherein the generated first and second sub-data items each represent said part of said spatial region and each are associated with a different temporal parameter.

8. The method according to claim 1, wherein said generating first and second sub-data items comprises:
processing said stored data item indicating a property of the communications network, and said second data indicating a property of said communications network; and
generating said first and second sub-data items based upon said processing.

9. The method according to claim 1, wherein said predetermined temporal criterion is selected from the group consisting of:
a criterion based upon a time of day;
a criterion based upon a day of the week;
a criterion based upon one or more months of the year; and
a criterion based upon a reoccurring temporal event.

10. The method according to claim 1, wherein said property of said communications network is selected from the group consisting of: an indication of a communications protocol in a particular spatial region; an indication of a communications protocol provided by a particular communications network in a particular spatial region; an indication of a signal strength; an indication of network speed; an indication of the availability of one or more networks; an indication of a signal to noise ratio; and indication of data throughput.

11. The method according to claim 1, wherein first data is received from a first device and said second data is received from a second device.

12. The method according to claim 11, wherein said first and second devices are associated with respective first and second vehicles.

13. The method according to claim 1, further comprising:
generating at least one data structure comprising data indicative of each of a plurality of data items, and sub-data items associated with a spatial region: and
transmitting at least part of said generated data structure to a communications device.

14. A method of storing data indicating a property of a communications network, the method comprising:
obtaining a stored data item associated with at least part of a spatial region and having an associated spatial parameter and an associated temporal parameter, the stored data item indicating a property of the communications network;
receiving second data indicating a property of said communications network at a particular location in said spatial region at a particular time; and
processing said spatial parameter, said temporal parameter, data indicating said particular location and data indicating said particular time and, based upon said processing, generating first and second sub-data items, each of said first and second sub-data items having an associated spatial parameter and an associated temporal parameter, at least one of the first and second sub-data items having a spatial or temporal parameter different from that associated with the stored data item;
wherein said generating first and second sub-data items comprises:
processing said stored data item indicating a property of the communications network, and said second data indicating a property of said communications network; and
generating said first and second sub-data items based upon said processing;
wherein said processing said stored data item indicating a property of the communications network comprises:
comparing said stored data item indicating a property of the communications network, and said second data indicating a property of said communications network; and
generating said first and second sub-data items if said comparison satisfies a predetermined criterion.

15. A method of storing data indicating a property of a communications network, the method comprising:

obtaining a stored data item associated with at least part of a spatial region and having an associated spatial parameter and an associated temporal parameter, the stored data item indicating a property of the communications network;

receiving second data indicating a property of said communications network at a particular location in said spatial region at a particular time; and processing said spatial parameter, said temporal parameter, data indicating said particular location and data indicating said particular time and, based upon said processing, generating first and second sub-data items, each of said first and second sub-data items having an associated spatial parameter and an associated temporal parameter, at least one of the first and second sub-data items having a spatial or temporal parameter different from that associated with the stored data item, wherein said generating said first and second sub-data items comprises:

generating four sub-data items, the four sub-data items together representing said spatial region and each representing a sub-region of said spatial region;

wherein a first of said four sub-data items is said first sub-data item and a second of said sub-data items is said second sub-data item; and wherein a third of said sub-data items and a fourth of said sub-data items are each based upon at least one of said first and second data.

16. The method according to claim 15, wherein said four sub-data items each represents a sub-region of approximately equal size.

17. A communications system arranged to perform the method according to claim 1.

18. A non-transitory computer readable medium comprising a non-transitory computer readable storage medium having computer readable instructions tangibly embodied thereon to cause a computer to carry out the method according to claim 1.

* * * * *